(12) United States Patent
Rollins et al.

(10) Patent No.: US 6,622,257 B1
(45) Date of Patent: Sep. 16, 2003

(54) COMPUTER NETWORK WITH SWAPPABLE COMPONENTS

(75) Inventors: Doug Rollins, Nampa, ID (US); Raymond Thorn, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/502,793

(22) Filed: Feb. 11, 2000

(51) Int. Cl.<sup>7</sup> ................................................. G06F 11/00
(52) U.S. Cl. .......................................... 714/4; 709/223
(58) Field of Search ............................... 714/3, 4, 5, 7, 714/2; 709/223, 226

(56) References Cited

U.S. PATENT DOCUMENTS

| | | | | |
|---|---|---|---|---|
| 5,675,724 A | * | 10/1997 | Beal et al. ..................... | 714/4 |
| 5,777,874 A | * | 7/1998 | Flood et al. ................... | 700/82 |
| 5,832,195 A | * | 11/1998 | Braun et al. ................... | 714/2 |
| 6,047,222 A | * | 4/2000 | Burns et al. ................... | 700/79 |
| 6,049,825 A | * | 4/2000 | Yamamoto ..................... | 709/221 |
| 6,108,300 A | * | 8/2000 | Coile et al. ................... | 370/217 |
| 6,195,760 B1 | * | 2/2001 | Chung et al. .................. | 714/4 |
| 6,263,433 B1 | * | 7/2001 | Robinson et al. ............ | 713/100 |
| 6,327,675 B1 | * | 12/2001 | Burdett et al. ................ | 714/11 |
| 6,378,085 B1 | * | 4/2002 | Morinaga ...................... | 714/3 |

\* cited by examiner

*Primary Examiner*—Robert Beausoliel
*Assistant Examiner*—Christopher S. McCarthy
(74) *Attorney, Agent, or Firm*—Perkins Coie LLP

(57) ABSTRACT

A system and method for a fault tolerant computer network system are disclosed. The system and method provide for locating functional components of clients in a computer network station. The computer network station includes a network server, as well as multiples of functional components for the clients including a redundant spare of each type of functional component. Upon a failure of one of a client's functional components, the computer network station substitutes the redundant component for the failed client component.

24 Claims, 4 Drawing Sheets

US 6,622,257 B1

COMPUTER NETWORK WITH SWAPPABLE COMPONENTS

BACKGROUND OF THE INVENTION

I. Field of the Invention

The present invention relates generally to an apparatus and method for a fault tolerant computer network. More specifically, it relates to a computer network system with swappable components.

II. Description of the Related Art

With current methods and technologies, when computer systems are networked to facilitate the sharing of files, data, applications, electronic mail, or any other shared data and/or resources, either peer-to-peer or client/server network models are typically employed.

In the case of peer-to-peer networking, a collection of two or more standard, self-contained workstations (e.g., personal computers) are simply joined with the appropriate cable, controller device(s), and software. This type of network is a relatively low cost solution, but is also difficult to manage. Each individual workstation is installed in a work area and hence any service that needs to be done must be performed at the installed site. For a service team, this may mean locating a user's work area (office) on a work order, discerning which of perhaps several workstations need service, and ensuring the correct parts to service the workstation are available. Due to the potential differences between workstations, the service team must either stock a large quantity of parts or allow the system to be down until such parts are ordered. Furthermore, if a user's workstation suffers a hardware failure, not only is the user's data possibly lost, but the user is relatively unproductive until that workstation is repaired. Such repairs often require additional down time while the user's applications are reloaded, network connectivity is re-established, and the workstation's functionality is fully tested. Finally, depending on the network topology, a failed workstation may cause additional systems to lose network connectivity (in the case of a bus topology, token ring, etc.). This is particularly problematic for small networks.

In the case of a client/server network, the problems outlined above for peer-to-peer networking are compounded by the addition of a server. Not only must each client be maintained, but also the server introduces additional complexities should the server fail. If the server suffers a hardware failure, it is possible that all users on the network will lose connectivity.

Servers often employ hardware and/or software for fault tolerance. Examples of this include RAID systems, redundant power supplies, and automated "fail over" software which, in the case of a hardware failure, will re-distribute the load from the failed unit to functional units. This solution works well for the server based systems where the fault occurs at the server, but does not, in general, extend to the clients.

Many new case enclosure designs are evolving to make servicing a workstation/client easier. Such designs include swing out motherboard mounting systems and hot-swap power supplies. However, workstations/clients are by nature scattered throughout a company, therefore servicing a workstation/client requires dispatching a technician to the workstation/client and requires that the workstation/client and thus the user be non-productive while the problem is being fixed.

Regardless of the type of network employed, peer-to-peer or client/server, the network itself has little or no fault tolerance. As outlined above, if a single workstation/client fails it could cause other workstations/clients to lose network connectivity. Therefore, there exists a need for a fault tolerant computer network system where workstation/client failure is quickly resolved.

SUMMARY OF THE INVENTION

The present invention relates to a system and method for a fault tolerant computer network station. The system includes a computer network station. The computer network station functions as a server but also contains functional components of the clients. The computer network station may include motherboards for each client along with a spare motherboard. The computer network station may also include a storage device for each client along with a spare storage device. Upon a functional component failure, the computer network station identifies the failed client component, identifies whether a redundant component is available and, if available, switches the redundant component for the failed component. In the case of a motherboard failure of one of the clients, the computer network station automatically switches to the spare motherboard, thus decreasing downtime due to the failure. In the case of the failure of a storage device for one of the clients, the computer network station automatically switches the spare storage device to the failed client.

BRIEF DESCRIPTION OF DRAWINGS

The foregoing and other advantages and features of the invention will become more apparent from the detailed description of preferred embodiments of the invention which are provided below with reference to the accompanying drawings in which.

DETAILED DESCRIPTION

Figure 1:
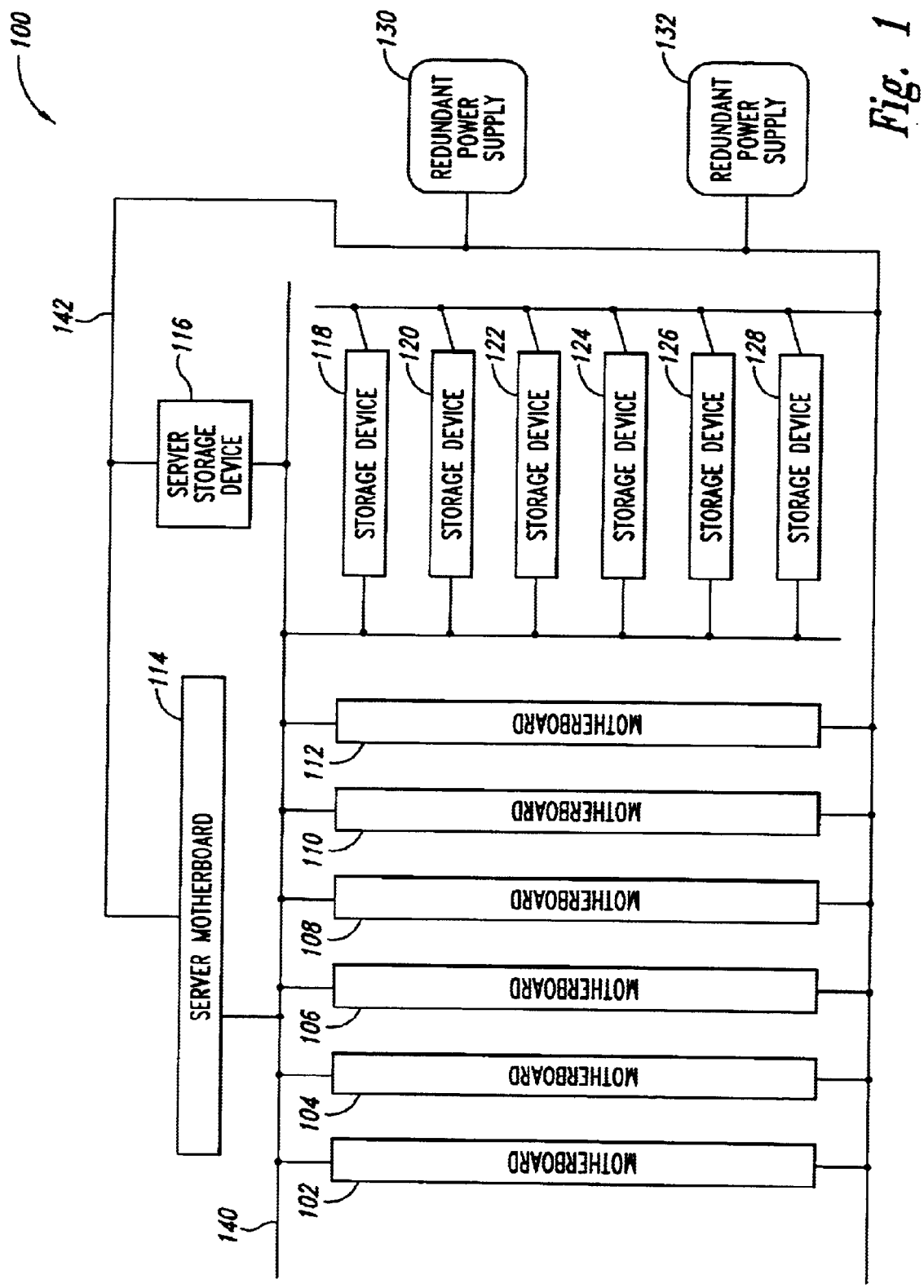
FIG. 1 illustrates a system in accordance with an embodiment of the present invention.

Referring now to the drawings, where like reference numerals designate like elements, there is shown in FIG. 1 a system 100 for providing a fault tolerant computer network to multiple clients. System 100 is configured for 5 workstations or network resources and comprises 6 motherboards 102, 104, 106, 108, 110, and 112; 6 storage devices 118, 120, 122, 124, 126, and 128; a server motherboard 114; server storage device 116 and redundant power supplies 130, 132. Each of the 6 motherboards 102, 104, 106, 108, 110, and 112 are equivalent in functionality as that which would be physically placed in each workstation in the prior art. The storage devices 118, 120, 122, 124, 126, and 128 are the type typically found in a workstation, e.g. hard drive, optical, magnetic, etc. The server motherboard 114 is one suitable for server use such as a dual processor motherboard. The server storage device 116 is that typically used for file sharing where data integrity is important, such as a redundant array of independent discs (RAID) system. The system 100 also employs redundant power supplies 130, 132 to account for failure of either power source. System 100 includes an internal data bus 140 and power supply bus 142.

Figure 2:
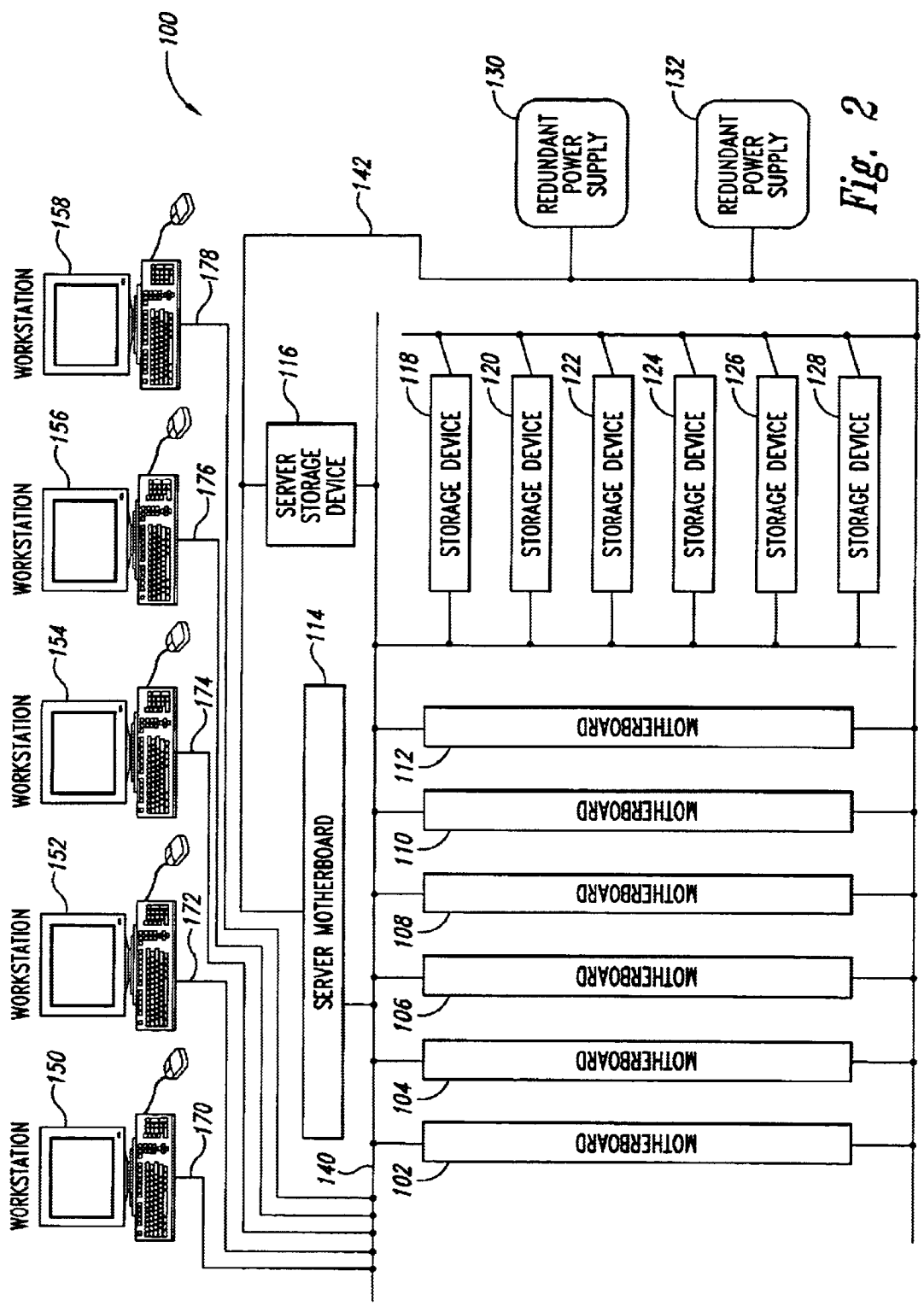
FIG. 2 illustrates the embodiment of the invention of FIG. 1 employing five clients and one server with no external devices.

As illustrated in FIG. 2, each of the workstations 150, 152, 154, 156, and 158 is connected to system 100 by a point to point connection to system 100's internal data bus 140 by communication cables 170, 172, 174, 176, and 178. Each workstation 150, 152, 154, 156, and 158 is initially assigned a respective motherboard 102, 104, 106, 108, or 110 and respective storage device 118, 120, 122, 124, or 126 physically residing within system 100. As noted above, system 100 is equipped with at least one more motherboard 112 than the number of workstations as well as at least one more storage device 128 than the number of workstations. Upon a workstation failure, which consists of any lapse in functionality which is unrecoverable due to failure of a workstation's hardware contained within system 100, an operational spare hardware component, if available, is automatically swapped for the failed hardware component. In the case of a hardware failure at the motherboard level, the system 100 automatically switches the failed workstation to the spare motherboard 112. In the case of a hardware failure in the storage device, the system 100 automatically switches to spare storage device 128. This swapping procedure minimizes downtime. Also, the service team need only go to one location to replace the faulty motherboard (102, 104, 106, 108, or 110) or storage drive (118, 120, 122, 124, or 126) without affecting any particular workstation 150, 152, 154, 156, or 158 or server component.

The fault may be detected by one of two software routines residing on the server motherboard 114, which functions as a detecting unit. First, system 100 can run a software routine on it server motherboard 114, which constantly monitors the functionality of the motherboards 102, 104, 106, 108, 110 and 112. This can be accomplished by a software routine that observes the input and output data of each respectively motherboard 102, 104, 106, 108, 110 and 112 for data errors. Second, faulty storage devices 118, 120, 122, 124, 126, and 128 may be detected by a software routine also residing on server motherboard 114, which check for faulty peripherals. This detection may alternatively be implemented at the workstation level, where system bios chips or direct memory interface chips can monitor specific hardware components.

Once a fault is detected, the server motherboard 114, which also functions as a substituting component, performs the hardware switch automatically such that the switch is transparent to a failed user and as well as to other functional users. The failed workstation 150, 152, 154, 156, or 158, upon the hardware switch, will be automatically re-booted and re-connected to the network. In this process, the likelihood does exist that the failed user will lose all local data, in the event of failure of a storage device 118, 120, 122, 124, or 126. However, as with most modern day servers, data on a user's personal storage device 118, 120, 122, 124, or 126 may be periodically updated to the server storage device 116. Likewise, the system 100 may also be configured to always store data on the server storage device 116 and use personal storage devices 118, 120, 122, 124, and 126 for backing up files. This invention is not limited to swapping of motherboards 102, 104, 106, 108, 110, and 112 and storage devices 118, 120, 122, 124, 126, and 128, but also extends to any other component ordinarily found in a workstation, which can be located within system 100.

Figure 3:
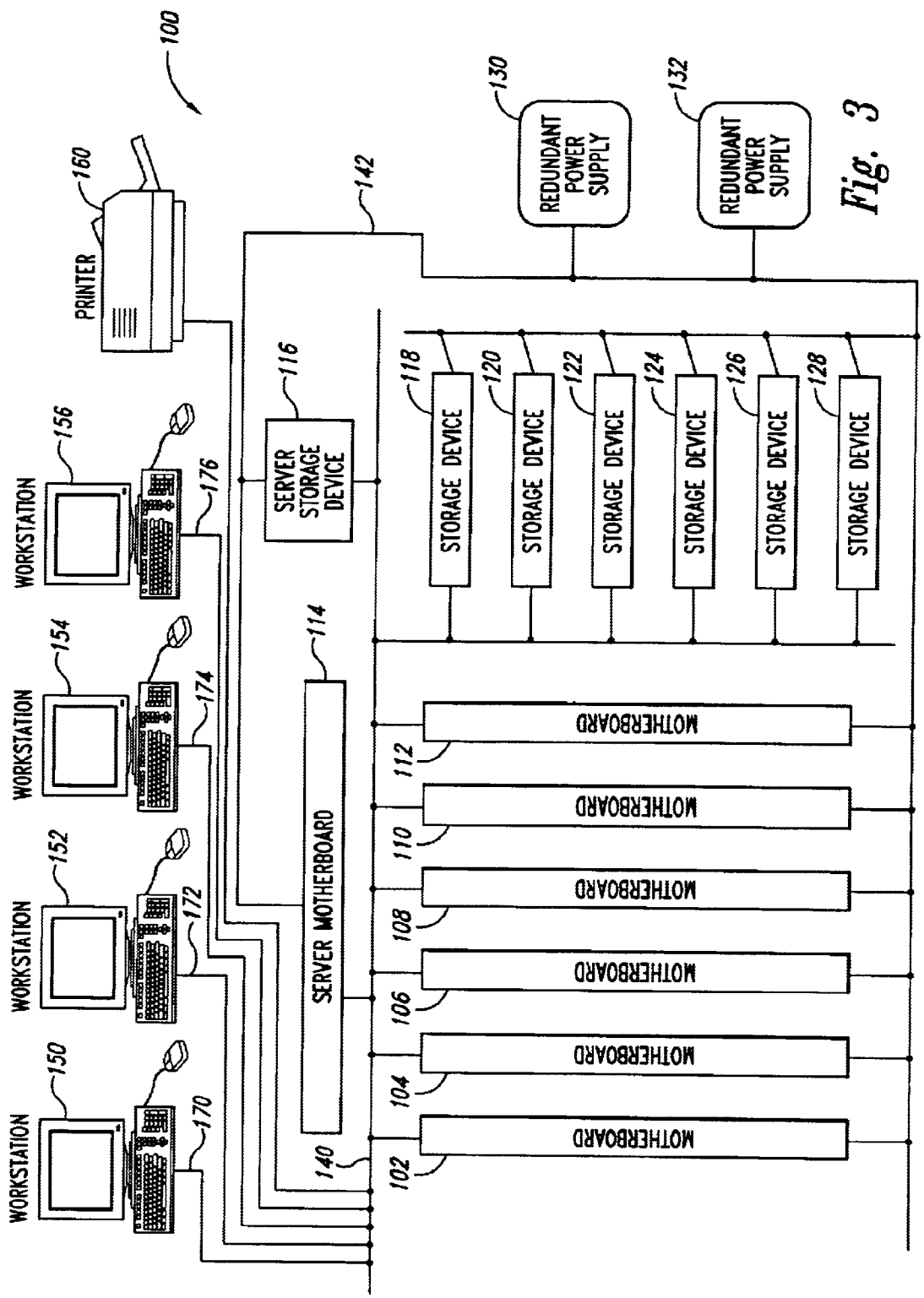
FIG. 3 illustrates the embodiment of the invention of FIG. 1 employing five clients, one of which may be a print server.

As shown in FIG. 3, the clients of system 100 are not limited to workstations (computers), but can include other clients such as network printers 160. Modems, facsimile machines and other peripherals may also function as clients for system 100.

Figure 4:
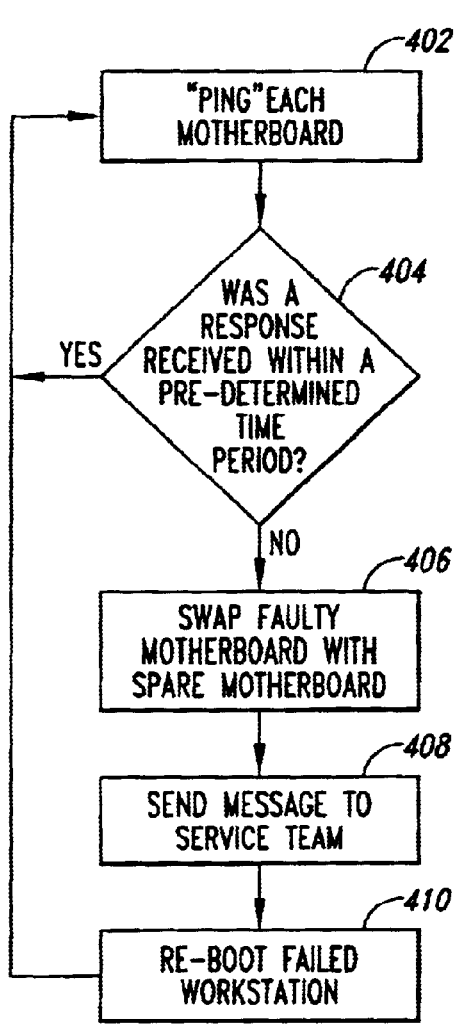
FIG. 4 is a flow chart illustrating the acts of an embodiment of the software routine used to detect a failed client motherboard.

In operation, as shown in FIG. 4, an embodiment comprises a software routine residing on the server motherboard 114. The server motherboard 114 first "pings" each motherboard 102, 104, 106, 108, and 110, using the "ping" operation 402 commonly known in the art. In act 404, the motherboard 114 then waits for a pre-determined time interval to see if each motherboard 102, 104, 106, 108, and 110 "pings" back to the server motherboard 114. If a ping is returned, that motherboard 102, 104, 106, 108, or 110 returning the ping is deemed functional and waits for the next cycle to begin back at step 402. If a ping is not returned by a motherboard 102, 104, 106, 108, or 110, that motherboard is deemed faulty, thus indicating a failed workstation 150, 152, 154, 156, or 158. Assuming the redundant spare motherboard 112 is not currently being used by another workstation 150, 152, 154, 156, or 158, the server motherboard 114 then initiates an electronic switch which logically swaps the spare motherboard 112 in place of the faulty motherboard 102, 104, 106, 108, or 110 (act 406). In act 408, the service team is then sent a message, i.e. through electronic mail, of the failure and swap that occurred. The failed workstation 150, 152, 154, 156, or 158 is then re-booted in act 410. This software routine is executed on a predetermined cycle, e.g., once every one thousand clock cycles.

Figure 5:
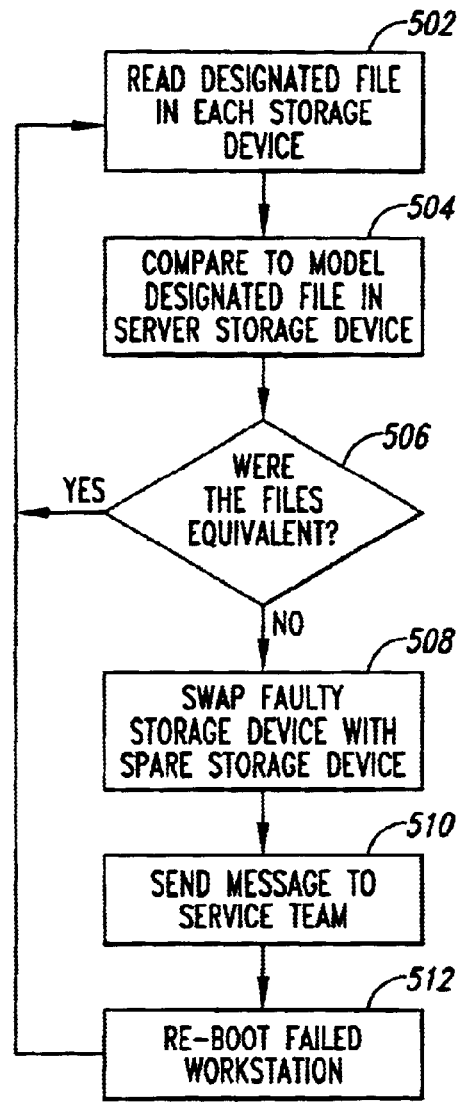
FIG. 5 is a flow chart illustrating the acts of an embodiment of the software routine used to detect a failed client storage device.

FIG. 5 illustrates another software routine residing in the server motherboard 114. The software routine of FIG. 5 checks for failed storage devices 118, 120, 122, 124, or 126. It begins with act 502, which attempts to read a designated file on each storage device 118, 120, 122, 124, 126, and 128 specifically placed on each device 118, 120, 122, 124, 126, and 128 for use by this routine. An identical file exists in the server storage device 116. In act 504, the server motherboard 114 compares the designated file in the server storage device 116 with that which was read from each storage device 118, 120, 122, 124, and 126. If the file read from a storage device 118, 120, 122, 124, or 126 is equivalent to the designated file read form the server storage device 116 then that storage device 118, 120, 122, 124, or 126 is deemed functional. If not, then the storage device 118, 120, 122, 124, or 126 is deemed faulty, thus a failed workstation 150, 152, 154, 156, or 158. In act 508, assuming the redundant spare storage device 128 is not currently being used by another workstation 150, 152, 154, 156, or 158, the faulty storage device 118, 120, 122, 124, or 126 is swapped with the spare storage device 128. Next, in act 510, a message is sent to the service team, i.e., via electronic mail, advising the service team of the storage device swap. Lastly, the failed workstation 150, 152, 154, 156, or 158 is re-booted in act 512.

The above illustrated invention provides a fault tolerant computer system network, where failed workstation components are swapped automatically, thus minimizing downtime of the user with the failed workstation.

The scope of the present invention is not to be considered as limited by the specifics of the particular structures which have been described and illustrated, but is only limited by the scope of the appended claims.

What is claimed as new and desired to be protected by Letters Patent of the United States is:

1. A fault tolerant computer system, said computer system comprising:
   a computer network station for delivering shared files and resources to at least one client;
   said at least one client connected to said computer network station, wherein at least one functional component of said at least one client is located in said computer network station and where said computer network station comprises M number of the same type of said at least one functional component for N number of clients and where M is greater than N;

a detecting unit for detecting a failed functional component of a client; and a substituting component for swapping said failed functional component of said client with an operational functional component for said client having said failed functional component.

2. The computer system of claim 1, wherein said at least one functional component comprises a motherboard.

3. The computer system of claim 1, wherein said at least one functional component comprises a storage device.

4. The computer system of claim 3, wherein said storage device comprises a hard drive.

5. The computer system of claim 3, wherein said storage device comprises an optical drive.

6. The computer system of claim 1, wherein said computer network station further comprises redundant power supplies for use in a power supply failure.

7. The computer system of claim 1, wherein said computer network station further comprises a shared storage device.

8. The computer system of claim 7, wherein said shared storage device comprises a redundant arrays of independent discs (RAID) storage device.

9. The computer system of claim 1, wherein said client comprises a workstation.

10. The computer system of claim 9, wherein said workstation comprises a personal computer.

11. The computer system of claim 1, wherein said client comprises a printer.

12. The computer system of claim 1, wherein said client comprises a fax machine.

13. The computer system of claim 1, wherein said client comprises a modem.

14. The computer system of claim 1, wherein M is one greater than N.

15. The computer system of claim 1, wherein each client is directly connected to a data bus of said computer network station by a point to point communication connection.

16. A fault tolerant computer network station, said computer network station comprising:

shared resources for at least one client;

at least one functional component for said at least one client, where the number of the same type of said at least one functional component equals M for N clients, where M is greater than N; and a substituting component for automatically switching a failed functional component of said at least one client with an operational functional component of said at least one client.

17. The computer network station of claim 16, wherein M is equal to N plus one.

18. A method of substituting components in a computer network station, said method comprising:

maintaining a plurality of client components and at least one redundant client component at said computer network station;

identifying a failed client component at said computer network station; and switching from a failed client component to said at least one redundant client component in response to said identification.

19. The method of claim 18, wherein said switching is performed automatically by said computer network station.

20. The method of claim 18 further comprising replacing said failed client component without interrupting the operation of said computer network station or other operational clients.

21. The method of claim 18 further comprising identifying whether said failed client component has said at least one redundant client component.

22. The method of claim 18, wherein said computer network station identifies a failed client component of a client.

23. The method of claim 18 further comprising identifying whether said failed client component has said at least one redundant client component which is available.

24. A method of swapping components in a computer network station, said method being performed automatically by said computer network station and comprising:

identifying a failed component of a client at said computer network station;

identifying whether a redundant component of said failed component is available at said computer network station; and if available, re-assigning said redundant component to said client.

* * * * *